(12) United States Patent
Mattia et al.

(10) Patent No.: US 10,901,829 B2
(45) Date of Patent: Jan. 26, 2021

(54) TROUBLESHOOTING USING A VISUAL COMMUNICATIONS PROTOCOL

(71) Applicant: International Business Machines Corporation, Armonk, NY (US)

(72) Inventors: Marco Mattia, Rome (IT); Massimo Marra, Rome (IT); Pietro Marella, Rome (IT); Nicola Milanese, Rome (IT)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 15/976,118

(22) Filed: May 10, 2018

(65) Prior Publication Data

US 2019/0347154 A1 Nov. 14, 2019

(51) Int. Cl.
*G06F 11/07* (2006.01)
*G06F 11/30* (2006.01)
*G06K 19/06* (2006.01)

(52) U.S. Cl.
CPC ...... *G06F 11/0766* (2013.01); *G06F 11/0793* (2013.01); *G06F 11/3055* (2013.01); *G06K 19/06037* (2013.01)

(58) Field of Classification Search
CPC ............ G06F 11/0766; G06F 11/3055; G06F 11/0793; G06F 11/0769; G06K 19/06037
See application file for complete search history.

(56) References Cited

U.S. PATENT DOCUMENTS

| 9,219,665 | B2 | 12/2015 | Windell |
| 9,329,966 | B2 | 5/2016 | Dugan et al. |
| 9,716,855 | B2 | 7/2017 | Gehring et al. |
| 2012/0121416 | A1* | 5/2012 | Sauer, Jr. ............. F03D 3/065 416/132 B |
| 2014/0131436 | A1* | 5/2014 | Critchley ............. G01R 31/25 235/375 |
| 2015/0083795 | A1 | 3/2015 | Baykal et al. |
| 2016/0191318 | A1 | 6/2016 | Neilson et al. |
| 2016/0261465 | A1 | 9/2016 | Gupta et al. |
| 2018/0203755 | A1* | 7/2018 | Das ................. G06F 11/0709 |

OTHER PUBLICATIONS

Disclosed Anonymously, "Use of Near Field Communication in Troubleshooting Server Errors", IPCOM000213445D, Dec. 2011, URL: https://priorart.ip.com/IPCOM/000213445, 2 pages.

* cited by examiner

*Primary Examiner* — Mohamed Charioui
*Assistant Examiner* — Eyob Hagos
(74) *Attorney, Agent, or Firm* — L. Jeffrey Kelly; SVL IPLaw

(57) ABSTRACT

A computer system troubleshoots a device using a visual communications protocol. An optically-readable diagnostic code corresponding to an error condition for a device experiencing the error condition is displayed on an optical display. A first response code generated in response to the diagnostic code is scanned via an optical scanner, wherein the first response code indicates a first set of troubleshooting instructions for the error condition. The first set of troubleshooting instructions is executed using at least one processor of the device. Embodiments of the present invention further include a method and program product for troubleshooting a device using a visual communications protocol in substantially the same manner described above.

18 Claims, 4 Drawing Sheets

TROUBLESHOOTING USING A VISUAL COMMUNICATIONS PROTOCOL

BACKGROUND

Present invention embodiments relate to troubleshooting computing systems, and more specifically, to troubleshooting computing systems using a visual communications protocol.

Troubleshooting refers to the problem-solving process of restoring functionality to a computing system that has encountered an error. In general, an error is diagnosed in a computing system, and specific operations are executed on the computing system in order to repair the diagnosed error. A technician can troubleshoot a system, or a system can automatically diagnose and attempt to troubleshoot some errors without requiring a technician with the knowledge to troubleshoot the system.

One aspect of troubleshooting may involve looking up error or diagnostic codes online and obtaining troubleshooting instructions from a remote server. When an error affects a system's network connection, it may not be possible to troubleshoot the error locally. Similarly, many computing systems are designed without any networking capability, or are air-gapped. Even if an affected system can connect to a network, there may not be any technicians nearby with the ability to diagnose error conditions and restore functionality.

SUMMARY

According to an embodiment of the present invention, a computer system troubleshoots a device using a visual communication protocol. An optically-readable diagnostic code corresponding to an error condition for a device experiencing the error condition is displayed on an optical display. A first response code generated in response to the diagnostic code is scanned with an optical scanner, wherein the first response code indicates a first set of troubleshooting instructions for the error condition. The first set of troubleshooting instructions is executed using at least one processor of the device. Embodiments of the present invention further include a method and program product for troubleshooting a device using a visual communications protocol in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to troubleshooting computing systems, and more specifically, to troubleshooting computing systems using a visual communications protocol. Troubleshooting a system locally can be difficult when an error affects the system's networking capability or when a technician is not in the vicinity. Present invention embodiments enable a mobile device to interact with a system using a visual communications protocol in order to troubleshoot the system. Both the system and the mobile device are equipped with a visual display and a code reader in order to establish a bidirectional communications channel. The system displays a diagnosis code corresponding to an error, which the mobile device scans, decodes, and uses to find troubleshooting instructions that are intended to address the error. The troubleshooting instructions may then be encoded in a response code, transmitted to the system in error, and executed accordingly.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
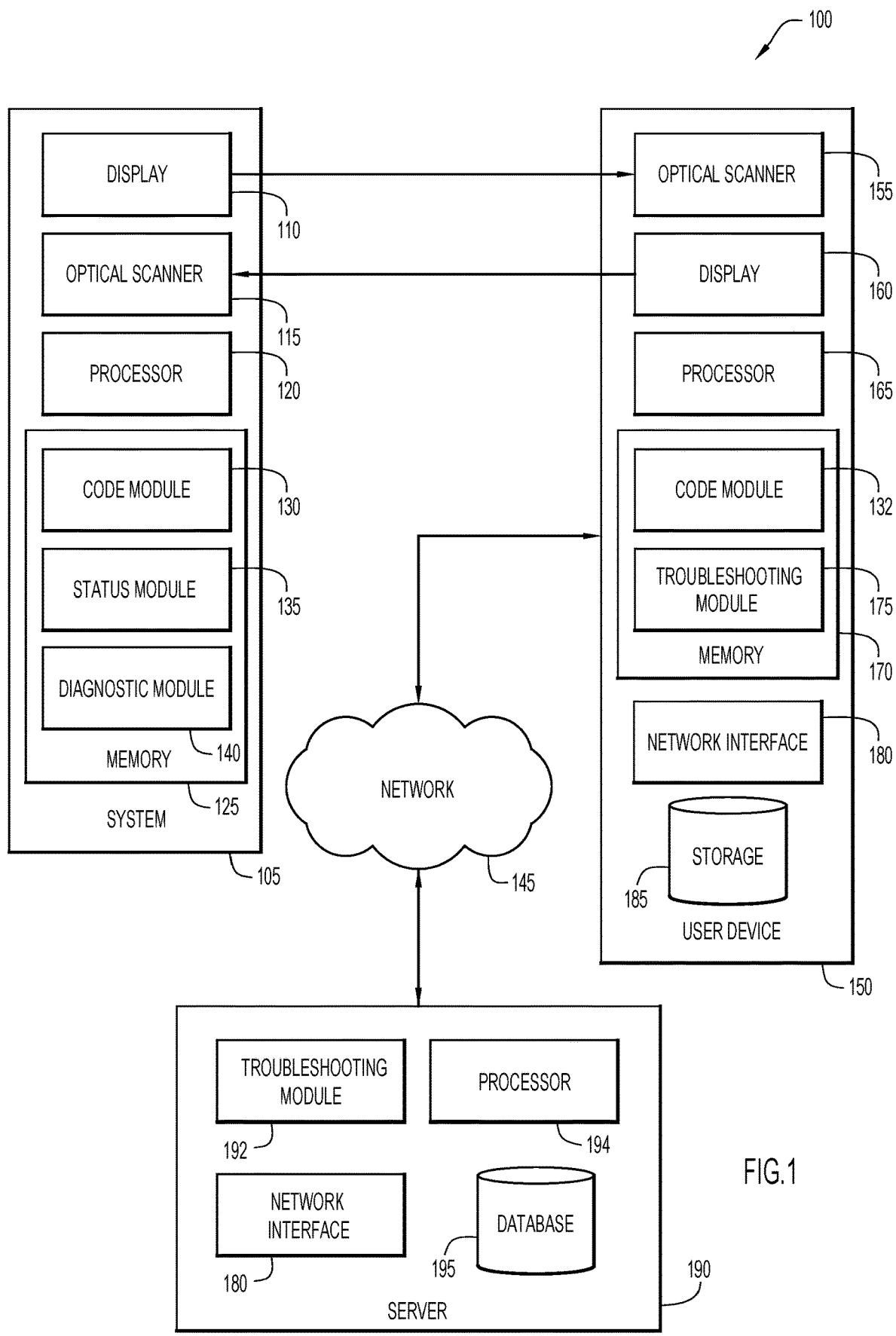
FIG. 1 is a block diagram depicting a computing environment for troubleshooting a system in accordance with an embodiment of the present invention.

Present invention embodiments will now be described in detail with reference to the Figures. FIG. 1 is a block diagram depicting a computing environment 100 for troubleshooting a system in accordance with an embodiment of the present invention. As depicted, computing environment 100 includes a system 105, network 145, a user device 150, and a server 190. Computing environment 100 may enable user device 150 to troubleshoot system 105 using a visual communications protocol. It is to be understood that the functional division among components of computing environment 100 have been chosen for purposes of explaining the present invention and is not to be construed as a limiting example.

System 105 includes a display 110, an optical scanner 115, a processor 120, and memory 125. In various embodiments of the present invention, system 105 may include a laptop computer, a tablet computer, a netbook computer, a personal computer (PC), a desktop computer, a personal digital assistant (PDA), a smart phone, a thin client, or any programmable electronic device capable of executing computer readable program instructions. In some embodiments, system 105 is a server or an Internet of Things device, such as a smart refrigerator or smart heating, ventilation, and air cooling (HVAC) system. System 105 may include an embedded computing device, such as a device embedded in a digital signage display, traffic control signal system, or interactive kiosk. System 105 may include internal and external hardware components, as depicted and described in further detail with respect to FIG. 4.

Display 110 may include any electronic device capable of presenting information in a visual form. For example, display 110 may be a liquid crystal display (LCD), a light-emitting diode (LED) display, an electronic ink display, and the like. System 105 may present optically-readable codes on display 110 that are generated by code module 130 and are readable by an external device, such as user device 150. Display 110 may be a primary display or a secondary display for system 105. The optically-readable codes displayed on display 110 may correspond to a system status of system 105, including any error conditions currently experienced by system 105, and software, hardware, and firmware specifications of system 105. Display 110 may also be used to visually identify and track devices like system 105 for inventory purposes.

Optical scanner 115 may include any input device, such as a camera or barcode reader, capable of reading codes presented to optical scanner 115. Such codes may appear on any medium, such as paper or an electronic display, and may include plain text, one-dimensional barcodes, or two-dimensional barcodes, such as quick response (QR) codes or high capacity color barcodes. Optical scanner 115 may be capable of reading codes that adhere to any standard of encoding information in an optically-readable form. In some embodiments, display 110 and/or optical scanner 115 are peripheral devices connected to system 105 via a wired or wireless connection such as a universal serial bus connection or a Bluetooth™ connection.

Code module 130, status module 135, and diagnostic module 140 may include one or more modules or units to perform various functions of present invention embodiments described below. The modules may be implemented by any combination of any quantity of software and/or hardware modules or units, and may reside within memory 125 of system 105 for execution by a processor, such as processor 120.

Code module 130 may convert information into optically-readable codes and back. Code module 130 may encode information such as the system status, firmware specifications of system 105, error codes, and diagnostic information, into an optically-readable code that may be presented on display 110. Code module 130 may also generate feedback codes that encode information regarding the result of executing troubleshooting instructions. When an optically-readable code is scanned by optical scanner 115, code module 130 may decode the code to receive information. Code module 130 may be capable of encoding and decoding optically-readable code in any format, including one-dimensional barcodes, two-dimensional barcodes, and the like. In some embodiments, code module 130 encodes and decodes QR codes.

Status module 135 may monitor the status of system 105 and any of its hardware and software components in order to determine whether system 105 is healthy or if system 105 has encountered an error. Status module 135 may determine that an error has occurred by monitoring system 105 for any feedback indicating that system 105 has encountered an error condition. For example, status module 135 may monitor an event log of system 105 for any feedback that indicates that an error has occurred. The event log may correspond to a particular software application, firmware application, hardware device, or may be an operating-system-level event log. When status module 135 determines that system 105 has encountered an error, status module 135 may indicate to diagnostic module 140 to begin collecting diagnostic information relating to the error.

Diagnostic module 140 may collect various diagnostic information relating to system 105. In some embodiments, diagnostic module 140 periodically scans components of system 105 to detect changes to firmware data, such as changes to a particular firmware's version number, changes to firmware settings, or addition or deletion of system components. Diagnostic module 140 may collect diagnostic information from event logs of system 105 (such as the event log(s) monitored by status module 135). Thus, the diagnostic information collected by diagnostic module 140 includes any error or diagnostic codes that describe an error or are associated with an error condition, as well as an updated record of hardware specifications, the versions of the software and firmware installed on system 105, and other diagnostic information, such as applications running when the error condition is first encountered, crash logs, memory dumps, and the like. Diagnostic module 140 may send collected diagnostic information to code module 130 so that the diagnostic information may be converted to an optically-readable code and presented on display 110.

Network 145 may include a local area network (LAN), a wide area network (WAN) such as the Internet, or a combination of the two, and includes wired, wireless, or fiber optic connections. In general, network 145 can be any combination of connections and protocols that will support communications between user device 150 and server 190 using their respective network interfaces 180 in accordance with embodiments of the present invention. System 105 may not be connected to network 145, or system 105 may have encountered an error condition that prevents system 105 from communicating over network 145.

User device 150 may include a laptop computer, a tablet computer, a netbook computer, a personal computer (PC), a desktop computer, a personal digital assistant (PDA), a smart phone, a thin client, or any programmable electronic device capable of executing computer readable program instructions. User device 150 may include internal and external hardware components, as depicted and described in further detail with respect to FIG. 4.

User device 150 may include an optical scanner 155, display 160, processor 165, memory 170, network interface 180, and storage 185. Optical scanner 155 and display 160 may be substantially similar to optical scanner 115 and display 110 of system 105. In some embodiments, user device 150 is a smartphone, optical scanner 155 is smartphone camera, and display 160 is a smartphone display. User device 150 may establish a bidirectional communication channel with system 105 using display 160 to present information encoded in optically-readable codes to optical scanner 115 of system 105, and using optical scanner 155 to receive information by reading optically-readable codes presented on display 110 of system 105.

Code module 132 and troubleshooting module 175 may include one or more modules or units to perform various functions of present invention embodiments described below. The modules may be implemented by any combination of any quantity of software and/or hardware modules or units, and may reside within memory 170 of user device 150 for execution by a processor, such as processor 165.

Code module 132 of user device 150 is substantially similar to code module 130 described above, and may encode and decode optically-readable codes. Code module 132 may encode information, such as the troubleshooting instructions, into a code that may be presented on display 160. When an optically-readable code is scanned by optical scanner 155, code module 132 may decode the code to receive diagnostic information corresponding to the error condition. Code module 132 may use conventional or other image processing techniques to decode an optically-readable code to receive information. Code module 132 may be capable of encoding and decoding optically-readable code in any format, such as one-dimensional barcodes, two-dimensional barcodes, and the like. In some embodiments, code module 132 encodes and decodes QR codes.

Troubleshooting module 175 may select troubleshooting instructions to address an error condition experienced by system 105. Troubleshooting module 175 may receive information relating to the error condition of system 105 that is collected by diagnostic module 140, encoded and displayed on display 110, and scanned by user device 150 using optical scanner 155. When diagnostic information is collected from a system, such as system 105, the diagnostic information may include a particular error code or other indicator that summarizes the error condition. Since optically-readable codes may encode a limited amount of information, system 105 may display an optically-readable code encoding an error code, and upon receiving the error code, troubleshooting module 175 may consult a database (such as storage 185 or database 195) to translate the error code into a more verbose description of the error encountered by system 105. For example, a system of two-digit decimal codes (for example, "00" through "99") can be used to describe one hundred unique error conditions, enabling an error condition to be communicated to a high degree of specificity in only a few bits. In some embodiments, troubleshooting module 175 of user device 150 may share the diagnostic information with troubleshooting module 192 of server 190, which may then perform some or all of the selection of troubleshooting instructions using resources available to server 190.

Once troubleshooting module 175 receives the diagnostic information from code module 130 relating to the error condition of system 105, troubleshooting module 175 may select troubleshooting instructions that enable recovery of the system in error. Troubleshooting module 175 may use the diagnostic information to look up troubleshooting instructions. Troubleshooting instructions may include any instructions that, when executed by a system experiencing an error condition, cause the system to recover from the error condition. Troubleshooting instructions may include any computer readable program instructions.

Troubleshooting module 175 may consult one or more databases containing troubleshooting instructions that are searchable based on the error condition described in the diagnostic information. Troubleshooting module 175 may search locally on storage 185 of user device 150 for troubleshooting instructions that correspond to the diagnostic information. In some embodiments, when a particular set of troubleshooting instructions is used to successfully recover a system from an error condition, the set of troubleshooting instructions is retained locally in storage 185 as a known solution to the error condition so that user device 150 may re-use the same troubleshooting instructions if the same error condition is encountered in the future.

Troubleshooting module 175 may also access remote resources to search for troubleshooting instructions that correspond to the diagnostic information. For example, troubleshooting module 175 may send a request for troubleshooting instructions to server 190 that contains diagnostic information received from system 105. Server 190 may reply with a response containing troubleshooting instructions that are a known solution to the error condition described in the diagnostic information.

Storage 185 may be any non-volatile storage media known in the art. For example, storage 185 can be implemented with a tape library, optical library, one or more independent hard disk drives, or multiple hard disk drives in a redundant array of independent disks (RAID). Similarly, data on storage 185 may conform to any suitable storage architecture known in the art, such as a file, a relational database, an object-oriented database, and/or one or more tables. User device 150 may store sets of troubleshooting instructions on storage 185, along with diagnostic information corresponding to each set of troubleshooting instructions, and an indication of whether each set of troubleshooting instructions is a known solution to the error condition described in the diagnostic information. In some embodiments, user device 150 may send sets of troubleshooting instructions, along with diagnostic information corresponding to each set of troubleshooting instructions and an indication of whether each set of troubleshooting instructions is a known solution to the error condition described in the diagnostic information, to server 190 for storage in database 195.

Server 190 may include a troubleshooting module 192, a processor 194, and at least one database, such as database 195, in which sets of troubleshooting instructions may be stored. Server 190 may include a laptop computer, a tablet computer, a netbook computer, a personal computer (PC), a desktop computer, a personal digital assistant (PDA), a smart phone, a thin client, or any programmable electronic device capable of executing computer readable program instructions. Server 190 may include internal and external hardware components, as depicted and described in further detail with respect to FIG. 4. Server 190 may receive requests from user device 150 containing diagnostic information, and may send responses to user device 150 containing troubleshooting instructions corresponding to the diagnostic information received.

Troubleshooting module 192 may select troubleshooting instructions to address an error condition experienced by system 105. Troubleshooting module 192 may receive information relating to the error condition of system 105 that is forwarded from user device 150. When diagnostic information is collected from a system, such as system 105, the diagnostic information may include a particular error code or other indicator that summarizes the error condition. Troubleshooting module 192 may consult a database (such as database 195 or a remote database accessible via network 145) to find troubleshooting instructions that correspond to the error condition experienced by system 105. When troubleshooting module 192 selects a set of troubleshooting instructions, troubleshooting module 192 may send the troubleshooting instructions to user device 150.

Database 195 may be any non-volatile storage media known in the art. For example, database 195 can be implemented with a tape library, optical library, one or more independent hard disk drives, or multiple hard disk drives in a redundant array of independent disks (RAID). Similarly, data on database 195 may conform to any suitable storage architecture known in the art, such as a file, a relational database, an object-oriented database, and/or one or more tables. Server 190 may store sets of troubleshooting instructions on database 195, along with diagnostic information corresponding to each set of troubleshooting instructions, and an indication of whether each set of troubleshooting instructions is a known solution to the error condition described in the diagnostic information. In some embodiments, when user device 150 determines that a particular set of troubleshooting instructions is a solution to an error condition, user device 150 provides the troubleshooting instructions (along with the fact that the troubleshooting instructions are a known solution to the error condition described) to server 190 for storage on database 195.

Figure 2:
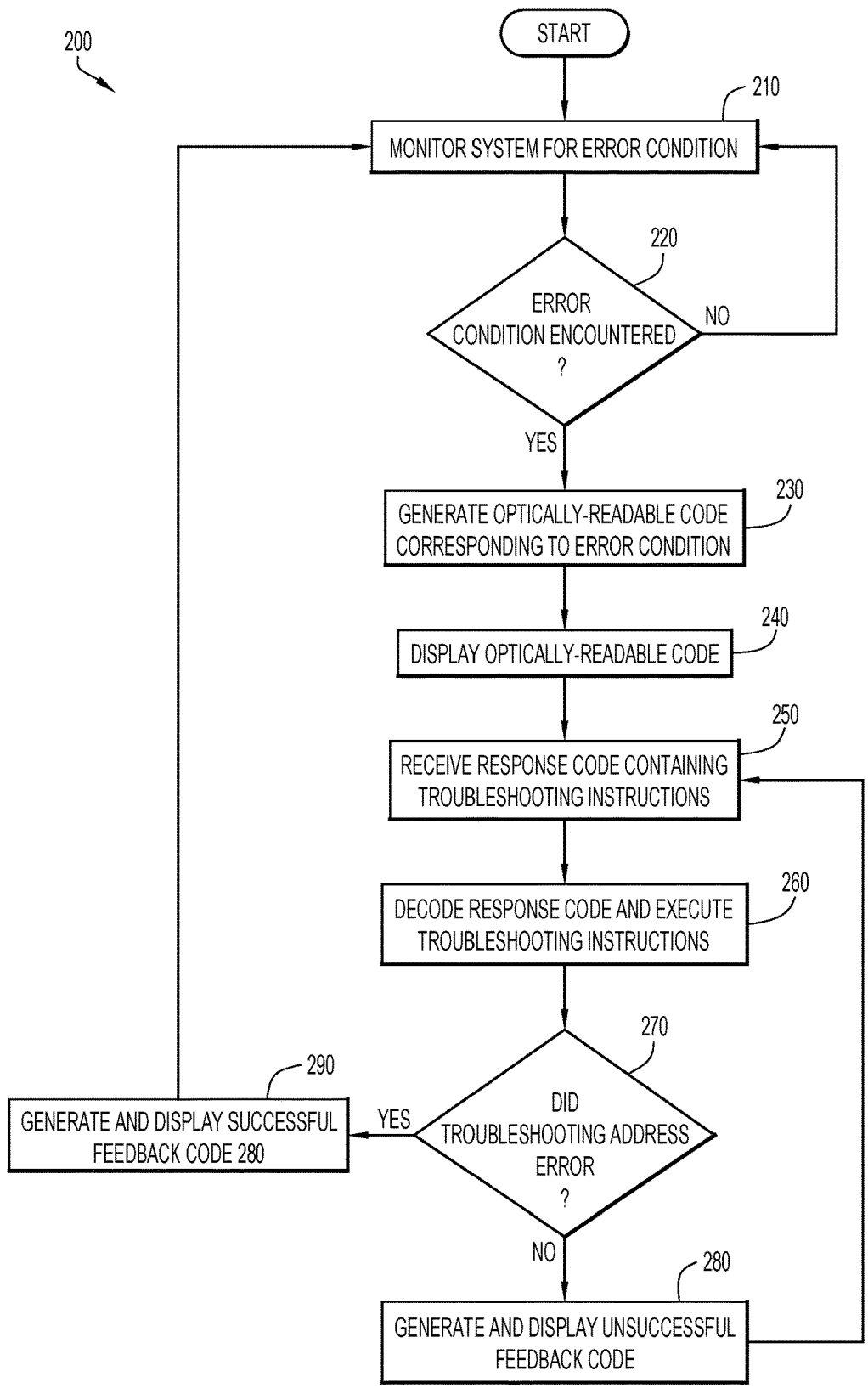
FIG. 2 is a flow chart depicting a method of troubleshooting a device in accordance with an embodiment of the present invention.

FIG. 2 is a flow chart depicting a method 200 of troubleshooting a system in accordance with an embodiment of the present invention. In general, troubleshooting may be performed using a visual communications protocol, which refers to the process by which information is exchanged between system 105 and user device 150 by displaying optically-readable codes on displays 110 and 160 and reading the optically-readable codes with optical scanners 115 and 155.

A system is monitored for an error condition at operation 210. An error condition may include any type of error encountered by system 105 and detected by status module 135. In some embodiments, a module, such as status module 135 monitors the status of a system, such as system 105, and any of its hardware and software components in order to determine whether or not system 105 is experiencing any error condition. Status module 135 may determine that an error has occurred by monitoring system 105 for any feedback indicating that system 105 has encountered an error condition. For example, status module 135 may monitor an event log of system 105 for any feedback indicative of an error condition. Error conditions may include any type of error relating to hardware, software, and/or firmware associated with system 105. Examples of error conditions may include occurrences like system 105 rebooting unexpectedly, a software program on system 105 encountering an error, a peripheral device connected to system 105 failing to perform a particular function, and the like.

Operation 220 determines whether the system is experiencing an error condition. If system 105 is found not to be in error, method 200 continues to monitor the system for an error condition.

An optically-readable code corresponding to the error condition is generated at operation 230 in response to encountering an error. In some embodiments, the optically-readable code is generated automatically in response to status module 135 detecting an error condition in system 105. The optically-readable code may be generated by code module 130 and may include any diagnostic information collected by diagnostic module 140 that relates to the error condition experienced by system 105. Code module 130 may generate optical codes in a plain text format, a one-dimensional barcode format, a two-dimensional barcode format, or any other visual format of encoding information. For example, an optically-readable code may encode information in a two-dimensional array of cells arranged in a pattern (such as a rectangle or square), and information may be encoded according to the color of each of the cells. In some embodiments, if the diagnostic information cannot be encoded into a single optically-readable code, then the diagnostic information may be encoded across multiple optically-readable codes.

An optically-readable code may encode information such as an identifier that can be used to track the system in error and recovery action(s) performed, firmware data relating to the system, and a system status, including current status and/or health codes. An optically-readable code may also include a destination route or uniform resource locator (URL) that can identify remote resources for looking up diagnostic codes (for example, diagnostic codes that are proprietary or specific to a particular software application, firmware version, and the like). Optically-readable codes may also include a command section that encodes any commands to be executed locally on system 105, and any responses or feedback resulting from execution of those commands.

The optically-readable code is displayed at operation 240. The optically-readable code may be automatically displayed in response to code module 130 generating the optically-readable code. In some embodiments, the optically-readable code is displayed on display 110 of system 105 so that the optically-readable code can be read by optical scanner 155 of user device 150. If the diagnostic information spans multiple optically-readable codes, then the multiple optically-readable codes may be displayed one at a time. For example, an optically-readable code that is a 101×101 QR code with high level error-correction can encode at maximum 3248 bits of data, so if the diagnostic information exceeds 3248 bits, then two or more optically-readable codes may be required to store the diagnostic information. In the case that multiple optically-readable are displayed one at a time, the optically-readable codes may be displayed in a predetermined order, or the optically-readable codes may themselves indicate a particular order in which the optically-readable codes encode diagnostic information. When user device 150 scans an optically-readable code, user device 150 may decode the optically-readable code using code module 132 in order to receive the diagnostic information that was collected by system 105. User device 150 may then search for troubleshooting instructions that can restore functionality to a device experiencing the error condition encountered by system 105. Once user device 150 selects a set of troubleshooting instructions, code module 132 of user device 150 encodes the troubleshooting instructions into an optically-readable response code, which is displayed on display 160 of user device 150. The troubleshooting instructions may be encoded as an optically-readable response code according to any conventional or other technique for arranging information in an optically-readable format.

A response code containing troubleshooting instructions is received by system 105 at operation 250. The response code may be displayed on display 160 of user device 150 and scanned by optical scanner 115 of system 105. In some embodiments, if the troubleshooting instructions cannot be encoded into a single optically-readable response code, then the troubleshooting instructions may be encoded across multiple response codes, which are then displayed on display 160 and read by optical scanner 115 one at a time.

The response code is decoded into troubleshooting instructions and executed at operation 260. The response code may be decoded into troubleshooting instructions according any conventional or other technique. Code module 130 of system 105 may decode the response code into troubleshooting instructions, which are sent to processor 120 for execution. The troubleshooting instructions may be executed automatically, or system 105 may prompt a user to confirm the execution of the troubleshooting instructions.

Operation 270 determines whether or not the troubleshooting instructions addressed the error condition of system 105. Once the troubleshooting instructions have been executed by processor 120, status module 135 may check system 105 to determine if the previously-identified error condition has been rectified by executing the troubleshooting instructions. For example, status module 135 may scan error logs to see if the error condition is still being logged. In some embodiments, executing the troubleshooting instructions generates feedback to inform status module 135 whether or not the troubleshooting instructions were able to successfully repair system 105. Status module 135 may also determine if system 105 is experiencing any additional error condition. If the troubleshooting instructions did not successfully repair system 105, or if system 105 is experiencing any other error condition, a feedback code is generated and displayed at operation 280. Code module 130 may generate an optically-readable code containing feedback information relating to the unsuccessful troubleshooting attempt. For example, a feedback code may indicate that troubleshooting instructions were unsuccessful in repairing system 105, and a feedback code may include any feedback generated as a result of executing the troubleshooting instructions. If troubleshooting instructions include several distinct operations, a feedback code may indicate which operations completed successfully and which failed. In the case that the troubleshooting instructions were successful and system 105 is experiencing another (related or unrelated) error condition, a feedback code may be generated that encodes diagnostic information for the remaining error condition.

Once the feedback code is generated, the feedback code is displayed on display 110 of system 105 for scanning by optical scanner 155 of user device 150. Method 200 returns to operation 250 to receive a new response code based on the information encoded in the feedback code. Method 200 may iterate operations 250 through 280 one or multiple times until there are no remaining error conditions.

If the troubleshooting instructions successfully treated the error condition, a feedback code indicating that the troubleshooting instructions successfully repaired the system is generated and displayed at operation 290. Code module 130 may generate an optically-readable code containing feedback information relating to the successful troubleshooting attempt, such as any feedback generated as a result of executing the troubleshooting instructions, the current status of system 105, and any other relevant details, such as how long the troubleshooting attempt took, or how many sets of troubleshooting instructions were attempted unsuccessfully before arriving at successful troubleshooting instructions. The optically-readable feedback code is displayed on display 110 of system 105 for scanning by optical scanner 155 of user device 150.

As an example of a troubleshooting process, user device 150 may scan an optically-readable code presented by system 105 that indicates an error condition and contains diagnostic information including a diagnostic routing code; troubleshooting module 175 of user device 150 may use the diagnostic routing code to connect to a remote system (such as server 190) to perform an error code analysis. Troubleshooting module 175 may then select troubleshooting instructions, including a sanity check command routine, which are encoded as a response code and shared with system 105 using a visual communications protocol. Next, system 105 executes the sanity check command routine to generate a sanity check result; the sanity check results are shared with user device 150 via the visual communications protocol, and troubleshooting module 175 determines that a particular component of system 105 is out of order. User device 150 shares a recovery command for that component with system 105 via the visual communications protocol, and system 105 executes the recovery command. If the recovery command successfully repairs the component, then system 105 may display a successful feedback code on display 110; if the recovery command did not successfully repair the component, then system 105 may display an unsuccessful feedback code.

Figure 3:
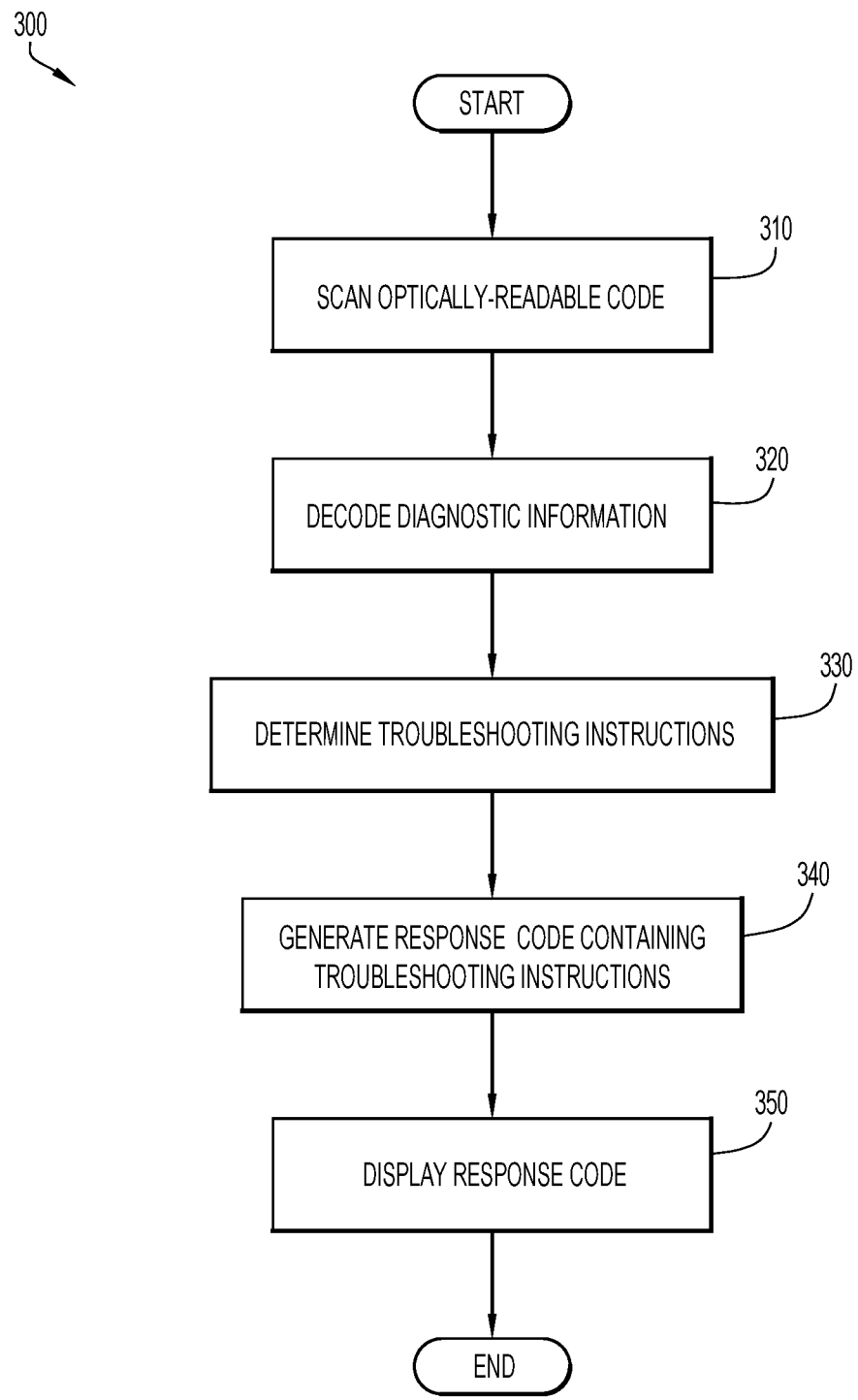
FIG. 3 is a flow chart depicting a method of retrieving troubleshooting instructions in accordance with an embodiment of the present invention.

FIG. 3 is a flow chart depicting a method 300 of retrieving troubleshooting instructions in accordance with an embodiment of the present invention.

An optically-readable code is scanned at operation 310. Optical scanner 155 of user device 150 may scan an optically-readable code displayed on display 110 of system 105 in order to receive information regarding the status of system 105. If system 105 has experienced an error, then system 105 will display an optically-readable code that contains diagnostic information corresponding to the error condition.

The diagnostic information is decoded from the optically-readable code at operation 320. Code module 132 of user device 150 may decode optically-readable codes utilizing any of a variety of information-encoding formats, such as a plain text format, one-dimensional barcodes, two-dimensional barcodes, and the like.

Troubleshooting instructions are determined at operation 330. Troubleshooting module 175 may select troubleshooting instructions that correspond to the error condition described in the diagnostic information received from system 105. Alternatively or additionally, user device 150 may share diagnostic information with server 190, and troubleshooting module 192 may select troubleshooting instructions that correspond to the error condition. Since troubleshooting instructions may be specific to the particular hardware, software, and firmware specifications of system 105, troubleshooting module 175 and/or troubleshooting module 192 may select troubleshooting instructions that are a known solution to the problem experienced by a device having specifications that are similar or identical to the specifications of system 105. Troubleshooting module 175 and/or troubleshooting module 192 may search for troubleshooting instructions locally in storage 185 of user device 150 or may search remote resources, such as database 195 of server 190, for a solution.

A response code containing the troubleshooting instructions is generated at operation 340. Code module 132 of user device 150 may encode the troubleshooting instructions into an optically-readable code according to any visual information-encoding formats, such as a plain text format, one-dimensional barcodes, two-dimensional barcodes, and the like. If the troubleshooting instructions cannot be stored as a single optically-readable code, then the troubleshooting instructions may span several optically-readable codes.

The response code is displayed at operation 350. The response code may be displayed on display 160 of user device 150 so that optical scanner 115 of system 105 can scan the response code. If the length of the troubleshooting instructions necessitated the use of multiple optically-readable response codes, then display 150 may display each code in succession so that optical scanner 115 may scan all of the optically-readable response codes.

Figure 4:
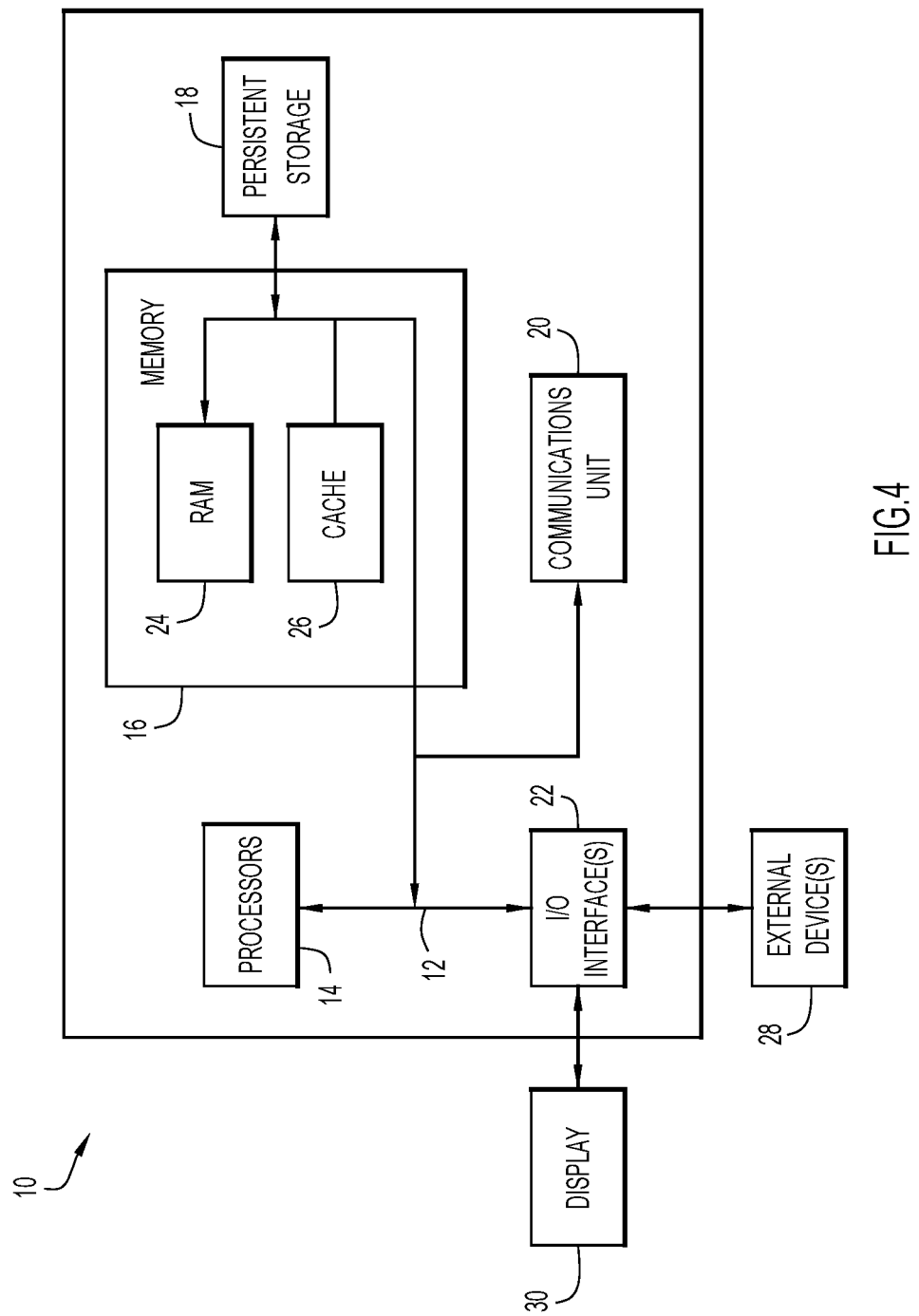
FIG. 4 is a block diagram depicting a computing device in accordance with an embodiment of the present invention.

FIG. 4 is a block diagram depicting components of a computer 10 suitable for executing the methods disclosed herein. Computer 10 may implement system 105, user device 150, and/or server 190 in accordance with embodiments of the present invention. It should be appreciated that FIG. 4 provides only an illustration of an embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, and the like), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data, including data encoded in or decoded from an optically-readable code, such as diagnostic information, troubleshooting instructions, feedback information, and system software, hardware, and firmware information, may be stored within any conventional or other data structures. For example, the data structures may include files, arrays, lists, stacks, queues, records, and the like. The data may be stored in any desired storage unit, such as a database, data or other repositories, queue, and the like. The data transmitted between system 105, user device 150, and server 190 may include any desired format and arrangement, and may include any quantity of any types of fields of any size to store the data. The definition and data model for any of the data may indicate the overall structure in any desired fashion, such as computer-related languages, graphical representation, listing, and the like.

Data, including data encoded in or decoded from an optically-readable code, such as diagnostic information, troubleshooting instructions, feedback information, and system software, hardware, and firmware information, may include any information provided to system 105, user device 150, and/or server 190. Data, including data encoded in or decoded from an optically-readable code, such as diagnostic information, troubleshooting instructions, feedback information, and system software, hardware, and firmware information, may include any desired format and arrangement, and may include any quantity of any types of fields of any size to store any desired data. The fields may indicate the presence, absence, actual values, or any other desired characteristics of the data of interest, such as quantity, value ranges, and the like. Data, including encoded in or decoded from an optically-readable code, such as diagnostic information, troubleshooting instructions, feedback information, and system software, hardware, and firmware information, may include all or any desired portion or any quantity of specific fields of data of interest relating to an error condition and/or solution to the error condition within a given implementation or system.

The data, including data encoded in or decoded from an optically-readable code, such as diagnostic information, troubleshooting instructions, feedback information, and system software, hardware, and firmware information, may include any data collected about entities by any collection mechanism, any combination of collected information, and any information derived from analyzing collected information.

The present invention embodiments may employ any number of any type of user interface (for example, Graphical User Interface (GUI), command-line, prompt, and the like) for obtaining or providing information (for example, when using a user device for troubleshooting a system experiencing an error condition), where the interface may include any information arranged in any fashion. The interface may include any number of any types of input or actuation mechanisms, such as buttons, icons, fields, boxes, links, and the like, disposed at any locations to enter/display information and initiate desired actions via any suitable input devices. For example, the input devices may include a mouse, keyboard, and the like. The interface screens may include any suitable actuators, such as links, tabs, and the like, to navigate between the screens in any fashion.

It will be appreciated that the embodiments described above and illustrated in the drawings represent only a few of the many ways of troubleshooting using a visual communications protocol.

The environment of the present invention embodiments may include any number of computer or other processing systems, such as client or end-user systems, server systems, and the like, and databases or other repositories arranged in any desired fashion, where the present invention embodiments may be applied to any desired type of computing environment. For example, the computing environment may include cloud computing, client-server, network computing, mainframe, stand-alone systems, and the like). The computer or other processing systems employed by the present invention embodiments may be implemented by any number of any personal or other type of computer or processing system, such as a desktop, laptop, PDA, mobile devices, and the like, and may include any commercially available operating system and any combination of commercially available and custom software. For example, the software may include operating system and third-party software on a system, core module 130, status module 135, diagnostic module 140, and troubleshooting module 175, and the like. These systems may include any types of monitors and input devices, such as a keyboard, mouse, voice recognition, and the like, to enter and/or view information.

It is to be understood that the software, such as operating system and third-party software on a system, core module 130, status module 135, diagnostic module 140, and troubleshooting module 175, and the like, of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as LAN, WAN, Intranet, Internet, hardwire, modem connection, wireless, and the like. For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments, such as operating system and third-party software on a system, core module 130, status module 135, diagnostic module 140, and troubleshooting module 175, and the like, may be available on a non-transitory computer useable medium. For example, the computer useable medium may be magnetic or optical mediums, magneto-optic mediums, floppy diskettes, CD-ROM, DVD, memory devices, and the like of a stationary or portable program product apparatus or device for use with stand-alone systems or systems connected by a network or other communications medium.

The communication network may be implemented by any number of any type of communications network, such as LAN, WAN, Internet, Intranet, VPN, and the like. The computer or other processing systems of the present invention embodiments may include any conventional or other communications devices to communicate over the network via any conventional or other protocols. The computer or other processing systems may utilize any type of connection, such as wired, wireless, and the like, for access to the network. Local communication media may be implemented by any suitable communication media, such as local area network (LAN), hardwire, wireless link, Intranet, and the like.

The system may employ any number of any conventional or other databases, data stores or storage structures, such as files, databases, data structures, data or other repositories, and the like, to store information. For example, the information may include troubleshooting instructions and data encoded in or decoded from an optically-readable code. The database system may be implemented by any number of any conventional or other databases, data stores or storage structures, such as files, databases, data structures, data or other repositories, and the like, to store the information. The database system may be included within or coupled to the server and/or client systems. The database systems and/or storage structures may be remote from or local to the computer or other processing systems, and may store any desired data, such as troubleshooting instructions and data encoded in or decoded from an optically-readable code.

The present invention embodiments may employ any number of any type of user interface, such as Graphical User Interface (GUI), command-line, prompt, and the like, for obtaining or providing information. For example, the information may include troubleshooting instructions and data encoded in or decoded from an optically-readable code, where the interface may include any information arranged in any fashion. The interface may include any number of any types of input or actuation mechanisms, such as buttons, icons, fields, boxes, links, and the like, disposed at any locations to enter/display information and initiate desired actions via any suitable input devices. For example, the input devices may include a mouse, keyboard, and the like. The interface screens may include any suitable actuators, such as links, tabs, and the like) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for troubleshooting a device using a visual communications protocol, the method comprising:
   displaying, on an optical display, an optically-readable diagnostic code corresponding to an error condition for a device experiencing the error condition;
   scanning, via a first optical scanner associated with the device, a first response code generated in response to the diagnostic code, wherein the device scans the first response code to receive a first set of troubleshooting instructions for the error condition, and wherein the first response code is generated by a user device in response to the user device scanning, using a second optical scanner associated with the user device, the optically-readable diagnostic code displayed on the optical display of the device; and
   executing, using at least one processor of the device, the first set of troubleshooting instructions.

2. The computer-implemented method of claim 1, wherein the optically-readable diagnostic code is selected from the group consisting of: a plain text code, a one-dimensional barcode and a two-dimensional code.

3. The computer-implemented method of claim 1, wherein the optically-readable diagnostic code comprises an error condition description and device specifications, and wherein the first set of troubleshooting instructions are specific to the device specifications.

4. The computer-implemented method of claim 1, wherein the device is selected from the group consisting of: a server, an Internet of Things device, and an embedded computing device.

5. The computer-implemented method of claim 1, further comprising:
   responsive to executing the first set of troubleshooting instructions, displaying, on the optical display, a feedback code, wherein the feedback code comprises feedback information resulting from executing the first set of troubleshooting instructions.

6. The computer-implemented method of claim 5, further comprising:
   scanning, with the first optical scanner, a second response code to receive a second set of troubleshooting instructions, wherein the second response code is generated and displayed by the user device in response to the user device scanning, using the second optical scanner, the feedback code; and
   executing, using the at least one processor of the device, the second set of troubleshooting instructions.

7. A computer system for troubleshooting a device using a visual communications protocol, the computer system comprising:
   one or more computer processors;
   one or more computer readable storage media;
   program instructions stored on the one or more computer readable storage media for execution by at least one of the one or more computer processors, the program instructions comprising instructions to:
   display, on an optical display, an optically-readable diagnostic code corresponding to an error condition for a device experiencing the error condition;
   scan, via a first optical scanner associated with the device, a first response code generated in response to the diagnostic code, wherein the device scans the first response code to receive a first set of troubleshooting instructions for the error condition, and wherein the first response code is generated by a user device in response to the user device scanning, using a second optical scanner associated with the user device, the optically-readable diagnostic code displayed on the optical display of the device; and
   execute, by the device, the first set of troubleshooting instructions.

8. The computer system of claim 7, wherein the optically-readable diagnostic code is selected from the group consisting of: a plain text code, a one-dimensional barcode and a two-dimensional code.

9. The computer system of claim 7, wherein the optically-readable diagnostic code comprises an error condition description and system specifications, and wherein the first set of troubleshooting instructions are specific to the system specifications.

10. The computer system of claim 7, wherein the device is selected from the group consisting of: a server, an Internet of Things device, and an embedded computing device.

11. The computer system of claim 1, further comprising instructions to:
   responsive to executing the first set of troubleshooting instructions, display, on the optical display, a feedback code, wherein the feedback code comprises feedback information resulting from executing the first set of troubleshooting instructions.

12. The computer system of claim 11, further comprising instructions to:
   scan, with the first optical scanner, a second response code to receive a second set of troubleshooting instructions, wherein the second response code is generated and displayed by the user device in response to the user device scanning, using the second optical scanner, the feedback code; and
   execute, using the at least one processor of the device, the second set of troubleshooting instructions.

13. A computer program product for troubleshooting a device using a visual communications protocol, the computer program product comprising one or more non-transitory computer readable storage media collectively having program instructions embodied therewith, the program instructions executable by a computer to cause the computer to:
   display, on an optical display, an optically-readable diagnostic code corresponding to an error condition for a device experiencing the error condition;
   scan, via a first optical scanner associated with the device, a first response code generated in response to the diagnostic code, wherein the device scans the first response code to receive a first set of troubleshooting instructions for the error condition, and wherein the first response code is generated by a user device in response to the user device scanning, using a second optical scanner associated with the user device, the optically-readable diagnostic code displayed on the optical display of the device; and
   execute, by the device, the first set of troubleshooting instructions.

14. The computer program product of claim 13, wherein the optically-readable diagnostic code is selected from the group consisting of: a plain text code, a one-dimensional barcode and a two-dimensional code.

15. The computer program product of claim 13, wherein the optically-readable diagnostic code comprises an error condition description and system specifications, and wherein the first set of troubleshooting instructions are specific to the system specifications.

16. The computer program product of claim 13, wherein the device is selected from the group consisting of: a server, an Internet of Things device, and an embedded computing device.

17. The computer program product of claim 13, further comprising program instructions to:
- responsive to executing the first set of troubleshooting instructions, display, on the optical display, a feedback code, wherein the feedback code comprises feedback information resulting from executing the first set of troubleshooting instructions.

18. The computer program product of claim 17, further comprising program instructions to:
- scan, with the first optical scanner, a second response code to receive a second set of troubleshooting instructions, wherein the second response code is generated and displayed by the user device in response to the user device scanning, using the second optical scanner, the feedback code; and
- execute, using the at least one processor of the device, the second set of troubleshooting instructions.

\* \* \* \* \*